United States Patent

Shimazaki et al.

(10) Patent No.: US 7,302,112 B2
(45) Date of Patent: Nov. 27, 2007

(54) CONTOUR-EMPHASIZING CIRCUIT

(75) Inventors: Shingo Shimazaki, Kanagawa (JP);
Taku Kihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 758 days.

(21) Appl. No.: 10/297,814

(22) PCT Filed: Apr. 11, 2002

(86) PCT No.: PCT/JP02/03632

§ 371 (c)(1),
(2), (4) Date: Dec. 10, 2002

(87) PCT Pub. No.: WO02/084997

PCT Pub. Date: Oct. 24, 2002

(65) Prior Publication Data

US 2003/0151684 A1    Aug. 14, 2003

(30) Foreign Application Priority Data

Apr. 11, 2001  (JP) ............................. 2001-113179

(51) Int. Cl.
G06K 9/40 (2006.01)
G06K 9/48 (2006.01)
G06K 15/00 (2006.01)
G06T 5/00 (2006.01)
H04N 1/407 (2006.01)
H04N 1/409 (2006.01)
H04N 5/21 (2006.01)

(52) U.S. Cl. ...................... 382/266; 382/199; 382/260; 348/625; 358/3.27

(58) Field of Classification Search ........ 382/260–266, 382/199; 348/252, 606, 625, 628, 629; 358/3.27, 358/447

See application file for complete search history.

(56) References Cited

U.S. PATENT DOCUMENTS

| 4,812,903 | A | * | 3/1989 | Wagensonner et al. ..... 358/521 |
| 5,374,995 | A | | 12/1994 | Loveridge et al. .......... 358/447 |
| 5,400,365 | A | * | 3/1995 | Tulai ......................... 375/334 |
| 5,767,900 | A | * | 6/1998 | Tanji et al. ................. 348/253 |
| 5,991,457 | A | * | 11/1999 | Ito et al. .................... 382/254 |

(Continued)

FOREIGN PATENT DOCUMENTS

EP  0 478 377  4/1992

(Continued)

*Primary Examiner*—Matthew C. Bella
*Assistant Examiner*—Yubin Hung
(74) *Attorney, Agent, or Firm*—Frommer Lawrence & Haug LLP; William S. Frommer; Thomas F. Presson

(57) ABSTRACT

An edge enhancement circuit uses bandpass filters to separate an original video signal into low-, middle- and high-frequency band edge components which will be supplied to waveform shaping circuits. Each of the waveform shaping circuits detects an amplitude peak level of the edge component, generates a gain coefficient based on the peak level, and multiplies the original video signal by the gain coefficient. The results of multiplication are added together to generate a final detail signal. Thus, the edge enhancement circuit amplifies the amplitude of the edge component having a frequency approximate to the spatial frequency of the video signal to provide an edge enhancement based on a frequency characteristic corresponding to the spatial frequency of the video signal.

11 Claims, 5 Drawing Sheets

U.S. PATENT DOCUMENTS 6,043,853 A * 3/2000 Shimazaki et al. ......... 348/625
6,798,455 B1 * 9/2004 Abe ........................... 348/353
7,218,420 B1 * 5/2007 Tai et al. .................... 358/3.2

FOREIGN PATENT DOCUMENTS

| | | |
|---|---|---|
| GB | 2 237 161 | 4/1991 |
| JP | 5-292454 | 11/1993 |
| JP | 8-186739 | 7/1996 |
| JP | 2001-169144 | 6/2001 |
| WO | WO 00 29893 | 5/2000 |

* cited by examiner

CONTOUR-EMPHASIZING CIRCUIT

TECHNICAL FIELD

The present invention relates to an edge enhancer to enhance edges of a video signal.

BACKGROUND ART

Conventionally, the video camera enhances edges of a picture to produce a video signal for an object having well-defined edges and an improved sharpness.

The edge enhancement circuit conventionally used in the video cameras will be described below with reference to FIG. 1. The edge enhancement circuit is generally indicated with a reference 101.

As shown in FIG. 1, the edge enhancement circuit 101 includes a bandpass filter (BPF) 111, gain control circuit 112, amplitude limiting circuit 113 and an addition circuit 114.

The edge enhancement circuit 101 is supplied with signals of a picture picked up.

The video signal supplied to the edge enhancement circuit 101 are supplied to the BPF 111 where a high frequency component will be extracted from the video signal. The high frequency component of the video signal contains an edge component of the picked-up picture. That is, the BPF 111 will provide the edge component representing the edge of the picture. The edge component output from the BPF 111 is supplied to the gain control circuit 112 where the extracted edge component will be multiplied by a predetermined gain adjustment coefficient to adjust the extent of the edge enhancement. The output from the gain control circuit 112 is supplied to the amplitude limiting circuit 113. The amplitude limiting circuit 113 limits the signal level of a part of the output from the gain control circuit 112, higher than a predetermined signal level, and provides a final detail signal (edge enhancement signal). The detail signal is supplied to the addition circuit 114. The addition circuit 114 generates a detail signal and adds it to the original main video signal.

The video signal having the detail signal added thereto as above will provide a picture having the edge thereof enhanced and thus showing the object having a well-defined edge.

Incidentally, the user of the video camera, namely, the photographer, wants to change the coefficients for edge enhancement according to his taste or a scene to pick up in some cases. In such cases, he or she should change the frequency (thickness) and signal level of the detail signal to be added to the original video signal.

For a picture containing more high frequency components of a spatial frequency of a video signal such as picture taken with the lens zoomed to the wide angle side, for example, the frequency characteristic of detail signal is set for emphasis of the high frequencies. Thus, the edge will be emphasized to be thin, resulting in a natural picture having the edge thereof emphasized with a higher definition. Also, for a picture containing more low spatial-frequency components of a video signal such as a picture taken with the lens zoomed to the telephoto side, the frequency characteristic of the detail signal is set for emphasis of the low frequencies. Thus, the edge will be emphasized to be thick, resulting in a well-defined picture with an improved sharpness.

In a video camera which does not assure any high naturalness and good S/N ratio of a picture, such as an ordinary household type, to emphasize the edge of a picture whose spatial frequency is high, the signal level of the detail signal should be set lower to prevent the S/F ratio from being worse in order to provide a clearer picture, while to emphasize the edge of a picture whose spatial frequency is low, the signal level of the detail signal should be set higher to provide a preferable picture whose sharpness is higher. On the contrary, however, in a video camera which assures a high definition and good S/N ratio of a picture, such as a broadcasting type, to emphasize the edge of a picture whose spatial frequency is higher, the signal level of the detail signal should be set higher to improve the sharpness, while to emphasize the edge of a picture whose spatial frequency is lower, the signal level of the detail signal should be set lower to provide a desirable picture whose definition is higher without being excessively emphasized.

To change the frequency characteristic for the edge enhancement as above, it is generally sufficient to change the frequency (thickness)of an edge component to emphasize by changing the passband frequency characteristic of the BPF 111 in the edge enhancement circuit 101. Generally in a video camera adopting the digital signal processing, the passband frequency characteristic of the bandpass filter can be changed by a built-in CPU (central processing unit). For example, the coefficient of the bandpass filter is variable, and the passband frequency characteristic can be changed by alerting the coefficient. Also, there have been proposed some video cameras in which there is provided, for example, a plurality of fixed-coefficient filters different in frequency character is provided in such a manner that signal outputs from the filters can be added together and the frequency characteristic can be changed by altering the ratio of mixing the output signals.

It should be reminded that since a picture being picked up always varies, the spatial frequency of the picture will not always be constant. Therefore, the spatial frequency of the picture changes in the course of a shooting, with the result that no optimum edge enhancement is possible with a set passband frequency characteristic and the frequency characteristic will be worse in some cases.

For example, if a picture being picked up with the lens originally set to the wide angle side and with settings for enhancement of the high frequency component of the frequency characteristic of a detail signal is zoomed in with the lens set to the telephoto side, it will blur without any sufficient edge enhancement irrespectively of the settings for the enhancement of the high frequency component since the spatial frequency of the video signal contains many low-frequency components. On the contrary, however, if a picture being picked up with the lens originally set to the telephoto side and settings for enhancement of the low-frequency component of the frequency characteristic of the detail signal is zoomed out to the wide angle side, it will have the high frequency component thereof insufficiently edge-enhanced irrespectively of the settings for the enhancement of the low frequencies of the frequency characteristic of the detail signal since the spatial frequency of the video signal contains more high-frequency components.

For generating a detail signal, however, a filter coefficient etc. are set before a shooting, they can hardly be changed during the shooting. Therefore, the conventional video camera cannot provide any appropriate edge enhancement in case the spatial frequency characteristic of a video signal during a shooting has changed.

To accommodate the variation of the spatial frequency due to the zoom-out and -in during a shooting, however, it is also possible to change the frequency characteristic of a detail signal or the gain by feeding back information about the zoomed position of the lens to the CPU built in the video camera. However, zooming of the lens to the wide angle side will not result in that the spatial frequency of a picture contains solely high frequencies over the display of the picture. Thus, even if the frequency characteristic and gain are changed according to a zoomed position of the lens, an unnatural edge-enhanced part will take place in the picture. Also, a time lag will take place until zooming information about the lens is reflected by the control of the detail signal, and the time lay will result in an unnatural edge-enhancement as the case may be.

DISCLOSURE OF THE INVENTION

Accordingly, the present invention has an object to overcome the above-mentioned drawbacks of the related art by providing an apparatus for, and a method of, providing an optimum edge enhancement even when the spatial frequency of a video signal being picked up has changed, and also optimally enhancing any part of a picture.

It is also an object of the present invention to provide a video camera capable of providing an optimum edge enhancement even when the spatial frequency of a video signal being picked up has changed, and also optimally enhancing any part of a picture.

The above object can be attained by providing an edge enhancer including according to the present invention:

extracting means for extracting, from an input video signal, edge components having different frequency components respectively;

coefficient generating means for generating coefficients corresponding to amplitudes of the edge components;

correcting means for correcting the edge components with the coefficients corresponding to the edge components; and combining means for combining the corrected edge components.

Also the above object can be attained by providing an edge enhancing method including, according to the present invention, steps of:

extracting, from an input video signal, edge components having different frequency components respectively;

generating coefficients corresponding to amplitudes of the edge components;

correcting the edge components with the coefficients corresponding to the edge components; and combining the corrected edge components.

Also, the above object can be attained by providing a video camera including according to the present invention:

picking up means for picking up an object so as to generate a video signal; and edge enhancing means having:

extracting unit for extracting, from the video signal, edge components having different frequency components respectively;

coefficient generating unit for generating coefficients corresponding to amplitudes of the edge components;

correcting unit for correcting the edge components with the coefficients corresponding to the edge components; and combining unit for combining the corrected edge components with the video signal.

BEST MODE FOR CARRYING OUT THE INVENTION

A video camera as an embodiment of the present invention will be described herebelow.

Figure 1:
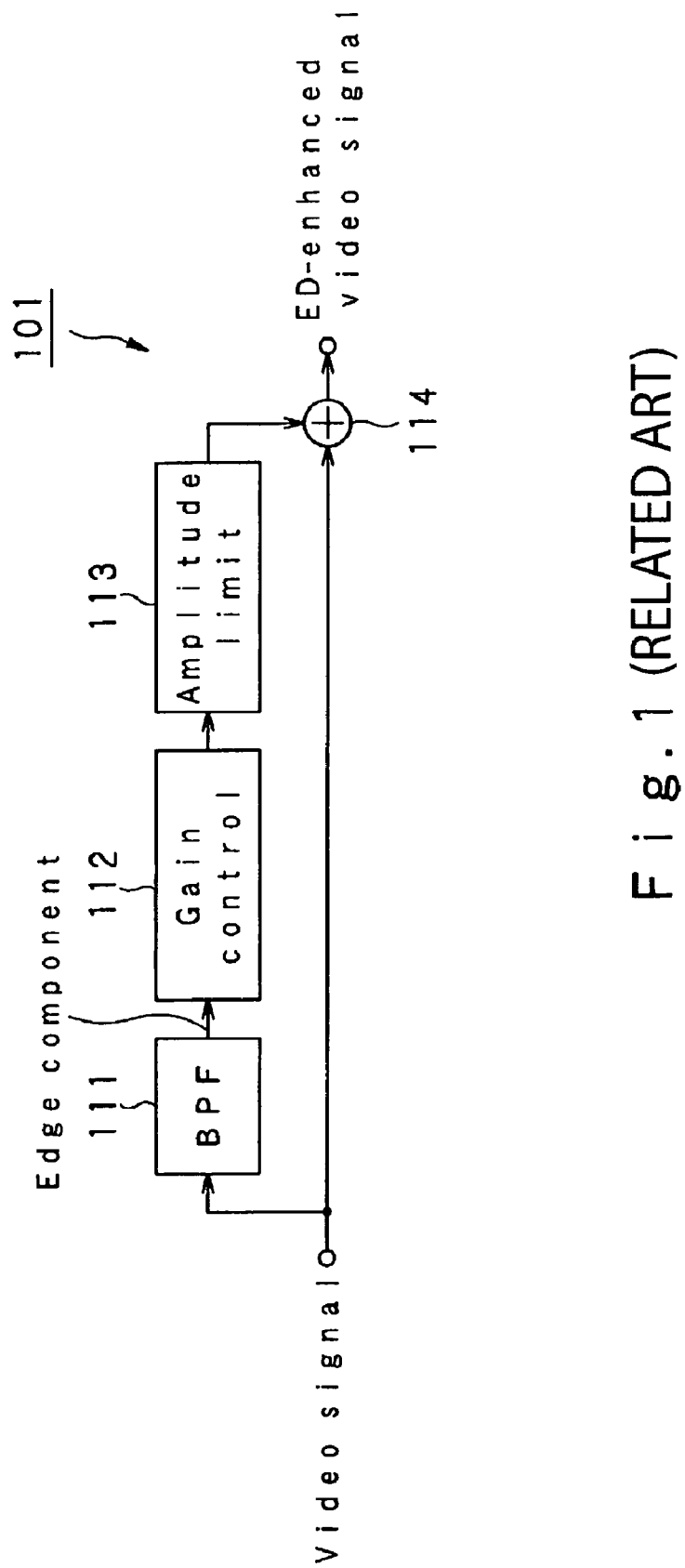
FIG. 1 is a block diagram of the conventional edge enhancer.
Figure 2:
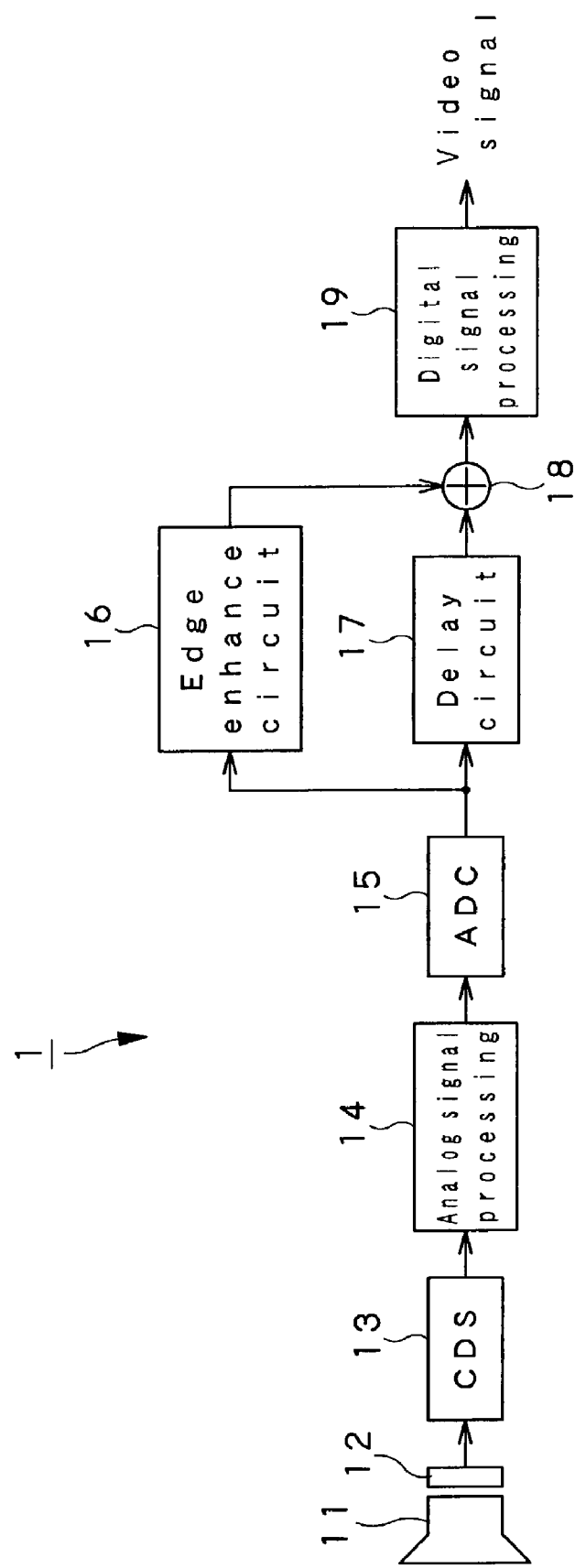
FIG. 2 is a block diagram of an embodiment of the video camera according to the present invention.

First the general construction of the video camera will be explained. FIG. 2 shows a block diagram of the video camera. The video camera is generally indicated with a reference 1.

The video camera 1 includes an image pickup lens 11, solid-state imaging element (CCD) 12, CDS (correlated double sampling) circuit 13, analog signal processing circuit 14, analog-to-digital conversion circuit (A/D converter) 15, edge enhancement circuit 16, delay circuit 17, addition circuit 18 and a digital signal processing circuit 19.

When an object is imaged using the video camera 1, light from the object will be incident upon the lens 11. The light from the lens 11 is incident upon the CCD 12 which will convert the light into an electric signal and output the electric signal. The electric signal output from the CCD 12 is supplied to the CDS circuit 13. The CDS circuit 13 makes correlated double sampling of the input signal to produce an analog video signal. The analog video signal is supplied to the analog signal processing circuit 14. The analog signal processing circuit 14 amplifies the analog video signal to a predetermined signal level, and makes various kinds of analog signal processing such as black/white balance adjustment, black/white shading correction, flare correction, etc. The analog video signal output from the analog signal processing circuit 14 is supplied to the A/D converter 15. The A/D converter 15 converts the analog video signal into a digital video signal by sampling at a predetermined rate. The digital video signal output from the A/D converter 15 is supplied to the edge enhancement circuit 16 and delay circuit 17.

The edge enhancement circuit 16 extracts a high-frequency component from the video signal and multiplies the high-frequency component by a gain coefficient to generate a detail signal intended for use to enhance an edge component of the video signal. The detail signal output from the edge enhancement circuit 16 is supplied to the addition circuit 18.

The delay circuit 17 is provided to delay the video signal the same time for which the signal is delayed by the edge enhancement circuit 16 to be in phase with the detail signal generated by the edge enhancement circuit 16. The video signal thus delayed by the delay circuit 17 is supplied to the addition circuit 18.

The addition circuit 18 adds the detail signal to the video signal to shape the waveform of the edge component. The vide signal thus shaped in waveform by the addition circuit 18 is supplied to the digital signal processing circuit 19.

The digital signal processing circuit 19 makes digital signal processing of the video signal such as kneeing, gamma correction, black/white clipping, etc. to generate digital video data.

Next, the edge enhancement circuit 16 in the video camera 1 will further be described with reference to FIG. 3.

Figure 3:
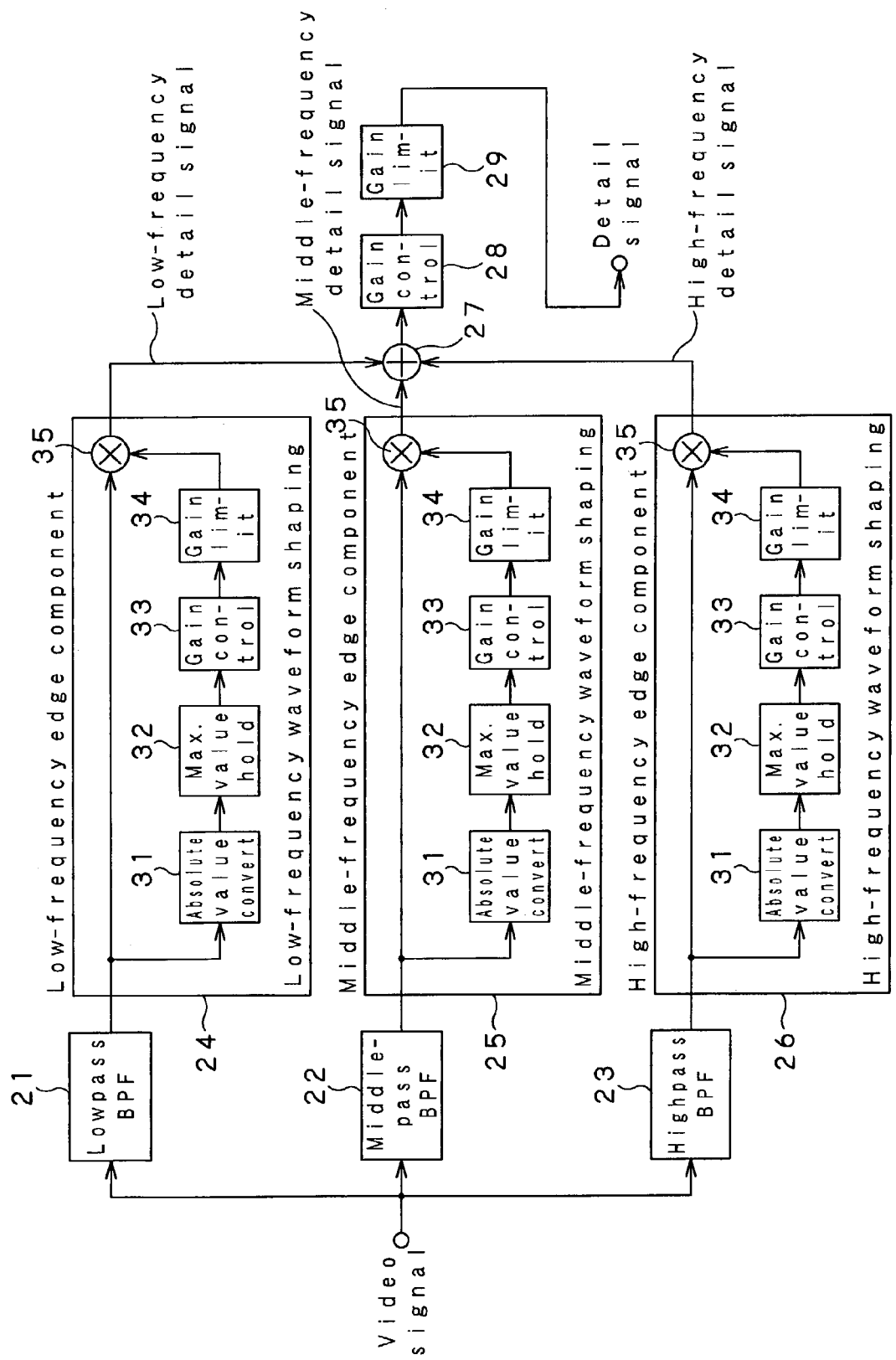
FIG. 3 is a block diagram of an edge enhancement circuit used in the embodiment of the video camera according to the present invention.

As shown in FIG. 3, the edge enhancement circuit 16 includes a lowpass bandpass filter (BPF) 21, middle-pass bandpass filter (BPF) 22, highpass bandpass filter (BPF) 23, low-frequency waveform shaping circuit 24, middle-frequency waveform shaping circuit 25, high-frequency waveform shaping circuit 26, addition circuit 27, gain control circuit 28 and an amplitude limiting circuit 29.

The video signal output from the A/D converter 15 of the video camera 1 is connected in parallel to the lowpass BPF 21, middle-pass BPF 22 and highpass BPF 23.

Figure 4:
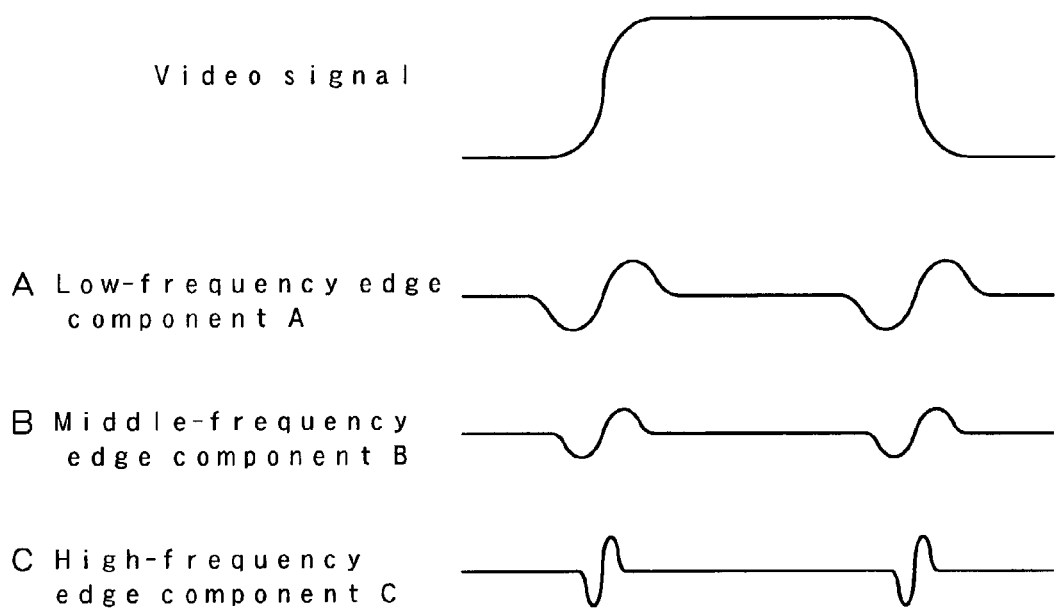
FIG. 4 explains the low, middle and high-frequency components extracted by a bandpass filter in the edge enhancement circuit in FIG. 3.

As shown in FIG. 4A, the lowpass BPF 21 extracts a low-frequency edge component from the input video signal and outputs it. The lowpass BPF 21 is set to show such a frequency characteristic that the center frequency included in the passband is a low-frequency edge component. A detail signal to enhance the low-frequency band (i.e., thick detail signal) is generated from the output from the lowpass filter 21. As shown in FIG. 4B, the middle-pass BPF 22 extracts a middle-frequency edge component from the input video signal and outputs it. The middle-pass BPF 22 is set to show a frequency characteristic that the center frequency of the passband is a middle-frequency edge component. A detail signal to enhance the middle-frequency band (i.e., middle-thickness detail signal) is generated from the output from the middle-pass BPF 22. As shown in FIG. 4C, the high-pass BPF 23 extracts a high-frequency edge component from the input video signal and outputs it. The high-pass BPF 23 is set to show a frequency characteristic that the center frequency of the passband is a high-frequency edge component. A detail signal to enhance the high-frequency band (i.e., thin detail signal) is generated from the output from the high-pass BPF 23.

The low-frequency edge component output from the lowpass BPF 21 is supplied to the low-frequency waveform shaping circuit 24. Also, the middle-frequency edge component output from the middle-frequency BPF 22 is supplied to the middle-frequency waveform shaping circuit 25. The high-frequency edge component output from the high-frequency BPF 23 is supplied to the high-frequency waveform shaping circuit 26.

The low-frequency waveform shaping circuit 24 includes an absolute value calculation circuit 31, maximum value holding circuit 32, gain control circuit 33, gain limitation circuit 34 and a multiplication circuit 35.

Figure 5:
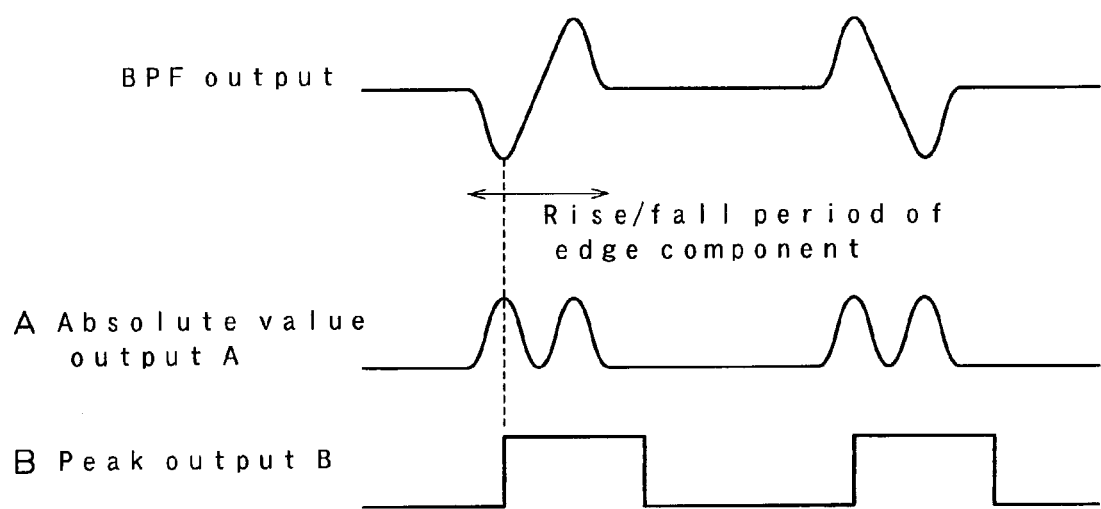
FIG. 5 explains signal outputs from an absolute value calculation circuit and maximum value holding circuit in the edge enhancement circuit in FIG. 3.

The absolute value calculation circuit 31 calculates an absolute value from an input low-frequency edge component as shown in FIG. 5A. The absolute value of the low-frequency edge component is supplied to the maximum value holding circuit 32 where the maximum value of an input signal will be held for a predetermined period as shown in FIG. 5B. This operation is intended to detect and hold a peak level of an envelope of the low-frequency edge component. The period for which the peak level is held for detection is set to such a predetermined value correspondingly to an interval between the rise and fall of the edge component. The peak level of the low-frequency edge component detected by the maximum value holding circuit 32 is supplied to the gain control circuit 33 where a detected peak level will be multiplied by a predetermined gain coefficient to control the gain. The gain-controlled signal is supplied to the gain limitation circuit 34. The gain limitation circuit 34 limits the signal level so that an input signal will not have any larger value than a predetermined one. The signal output from the gain limitation circuit 34 is supplied to the multiplication circuit 35 as again coefficient by which the low-frequency edge component is multiplied.

The multiplication circuit 35 multiplies the original low-frequency edge component output from the lowpass BPF 21 by a gain coefficient output from the level limitation circuit 34. The edge component multiplied by the gain coefficient is provided as a low-frequency detail signal.

The middle-frequency waveform shaping circuit 25 and high-frequency waveform shaping circuit 26 are constructed identically to the aforementioned low-frequency waveform shaping circuit 24. The middle-frequency waveform shaping circuit 25 generates a gain coefficient from the middle-frequency edge component, multiplies the original middle-frequency edge component by the gain coefficient to provide a middle-frequency detail signal. Similarly, the high-frequency waveform shaping circuit 26 generates a gain coefficient from the high-frequency edge component, multiplies the original high-frequency edge component by the gain coefficient to provide a high-frequency detail signal. It should be noted that since the peak value duration of the high-frequency edge component is shorter than that of the low-frequency edge component, the time for which the peak level is held by the maximum value holding circuit 32 of the high-frequency waveform shaping circuit 26 is shorter than that for which the peak level is held by the maximum value holding circuit 32 of the low-frequency waveform shaping circuit 24.

As above, the waveform shaping circuits 24, 25 and 26 generate the detail signal for enhancement of the low-frequency band (i.e., thick detail signal), detail signal for enhancement of the middle-frequency band (i.e., middle-thickness detail signal) and a detail signal for enhancement of the high-frequency band, respectively, which will be provided from the low-, middle- and high-frequency waveform shaping circuits 24, 25 and 26, respectively.

The low-, middle- and high-frequency detail signals are supplied to the addition circuit 27. The addition circuit 27 add these signals all together and outputs the result of addition to the gain control circuit 28.

The gain control circuit 28 controls the gain by multiplying the signal output from the addition circuit 27 by a predetermined multiplication coefficient. The gain-controlled signal is supplied to the gain limitation circuit 29 which will limit the signal level for an input signal not to have a larger value than a predetermined one.

Then, the signal output from the gain limitation circuit 29 is provided as a final detail signal.

As above, in the edge enhancement circuit 16, the BPFs 21, 22 and 23 separates the original video signal into low-, middle- and high-frequency edge components. Then, the waveform shaping circuits 24, 25 and 26 detect amplitude peak levels of the edge components, generate gain coefficients based on the peak levels, and multiply the edge components of the original frequency bands by the gain coefficients, respectively.

That is to say, the edge enhancement circuit 16 amplifies itself by converting its own amplitude into gains for the edge components of the frequency bands, respectively. Namely, the edge enhancement circuit 16 amplifies the low-, middle- and high-frequency edge components separately to values proportional to squares of them to generate details signals having the amplified values added thereto.

Therefore, the larger the amplitude of the original edge component, the larger the gain coefficient g by which the edge component is multiplied is. On the contrary, the smaller the amplitude of the original edge component, the smaller the gain coefficient by which the edge component is multiplied is.

Thus, since the amplitude of the edge component from one, having a passband frequency characteristic most approximate to the spatial frequency component of a video signal part in consideration, of the bandpass filters 21, 22 and 23 having low-, middle- and high-frequency passbands, respectively, has a largest gain, the edge component will be amplified with weighting the signal level of the video signal, most approximate to the spatial-frequency component. That is, there will be generated a detail signal amplified with the gain coefficient for a frequency characteristic corresponding to the spatial frequency of the video signal.

As above, in the edge enhancement circuit 16, the detail signal thus generated is added to the original video signal, so that the video signal is edge-enhanced with the detail signal having the frequency characteristic approximate to the spatial frequency of the video signal at any time and on any part of a screen, and thus an appropriate edge enhancement can be made depending upon the spatial frequency of the video signal.

Note that in the edge enhancement circuit 16, the frequency bands can further be weighted by properly adjusting the gain control circuit 33 in each of the waveform shaping circuits 24, 25 and 26. Thus, it is possible to generate either a thick or thin detail signal according to the photographer's taste. Also, by increasing the gain of the gain control circuit 33 for the low-frequency band while decreasing the gain of the high-frequency gain control circuit 33 for the high-frequency band, it is possible to provide a detail signal having a larger amplitude when the spatial frequency of the video signal is higher. On the contrary, the gain of the gain control circuit 33 for the low-frequency band can be decreased while the gain of the gain control circuit 33 for the high-frequency band be increased to reduce the amplitude of the detail signal for a higher spatial frequency part of the video signal and thus improve the S/N ratio.

Also, the higher the sampling frequency when detecting the amplitude peak level of the edge component output from each of the bandpass filters 21, 22 and 23, the more accurately the envelope of the edge component can be reproduced and amplitude peak level of the edge component can be detected. Therefore, a peak level can be detected more accurately by providing an up conversion circuit before the absolute value calculation circuit 31 to increase the sampling frequency for detection of the peak level and recovering the initial sampling frequency by a down conversion circuit after detection of the peak level.

In this embodiment, the edge component amplitude is detected by detecting a peak level as having been described above. According to the present invention, however, the edge component amplitude can be detected by detecting an actual value level, not any peak level, so long as the amplitude level of each frequency component can be detected.

Also in this embodiment, the gain coefficients are determined for the detail signals of the respective frequency bands, and multiplied by the original edge component. According to the present invention, however, the edge component may be corrected based on the gain coefficient by any method, not by multiplying the original edge component by the gain coefficient. Further, in this embodiment, the detail signals of the respective frequency bands are combined through the addition to generate the final detail signal.

According to the present invention, however, the detail signals may be combined by any other method, not through the addition.

Also in this embodiment, the three bandpass filter blocks are provided to generate the detail signals, respectively. However, provision of more than three filter blocks, for example, four or five ones, will make it possible to provide finer settings of detail-signal frequency characteristic and thus make the detail-signal frequency characteristic more approximate to that of the video signal.

Also the present invention has been described concerning the embodiment of a black/white video camera. However, the present invention can be applied to a color video camera by processing red signal (R), green signal (G) and blue signal (B), or processing the intensity signal (Y), in the similar manner to the aforementioned one. The aforementioned embodiment of the video camera uses the edge enhancement circuit by way of example. However, the present invention can widely be applied to video signal processors such as a video tape recorder, video disc recorder, TV receiver, video projector, etc., not only to the video camera.

The invention claimed is:

1. An edge enhancer apparatus comprising:
   extracting means for extracting, from an input video signal, edge components comprising at least a low-frequency component, a middle-frequency component and a high-frequency component;
   coefficient generating means for generating coefficients corresponding to amplitudes of the edge components;
   correcting means for correcting the edge components with the coefficients corresponding to the edge components, the correcting means configured to limit the corrected edge components to a predetermined maximum value; and
   combining means for combining the corrected edge components;
   wherein the correcting means multiplies the edge components by the corresponding coefficients;
   wherein the combining means adds the corrected edge components together; and
   wherein the coefficient generating means includes:
      absolute value calculating means for calculating absolute values of the edge components; and
      peak value detecting means for detecting peak values of the absolute values,
      wherein the peak values are held for a predetermined period corresponding to an interval between a rise and fall of the edge components, and
      wherein low-frequency edge components, middle-frequency edge components and high-frequency edge components are amplified separately to corresponding values proportional to squares of the low-frequency edge components, middle-frequency edge components and high-frequency edge components such that the larger the amplitude of the original edge component, the larger the coefficient by which the edge component is multiplied.

2. The apparatus as set forth in claim 1, further comprising video signal combining means for combining a signal combined together by the combining means with the input video signal.

3. The apparatus as set forth in claim 1, wherein:
   the extracting means includes bandpass filters to separate the input video signal into edge components of different frequencies, respectively.

4. The apparatus as set forth in claim 3, wherein the coefficient generating means includes:
coefficient calculating unit for calculating coefficients based on the peak values.

5. A video camera apparatus comprising image-capturing means for capturing an image of an object so as to generate a video signal, and edge enhancing means, said edge enhancing means comprising:
an extracting unit for extracting, from the video signal, edge components comprising at least a low-frequency component, a middle frequency component and a high-frequency component;
a coefficient generating unit for generating coefficients corresponding to amplitudes of the edge components;
a correcting unit for correcting the edge components with the coefficients corresponding to the edge components, the correcting unit configured to limit the corrected edge components to a predetermined maximum value; and
a combining unit for combining the corrected edge components with the video signal;
wherein the correcting unit multiplies the edge components by the corresponding coefficients;
wherein the combining unit adds the corrected edge components together; and
wherein the coefficient generating unit includes:
an absolute value calculating unit for calculating absolute values of the edge components; and
a peak value detecting unit for detecting peak values of the absolute values,
wherein the peak values are held for a predetermined period corresponding to an interval between a rise and fall of the edge components, and
wherein low-frequency edge components, middle-frequency edge components and high-frequency edge components are amplified separately to corresponding values proportional to squares of the low-frequency edge components, middle-frequency edge components and high-frequency edge components such that the larger the amplitude of the original edge component, the larger the coefficient by which the edge component is multiplied.

6. The apparatus as set forth in claim 5, wherein:
the extracting unit includes bandpass filters to separate the input video signal into edge components of different frequencies.

7. The apparatus as set forth in claim 6, wherein the coefficient generating unit includes:
coefficient calculating unit for calculating coefficients based on the peak values.

8. An edge enhancing method comprising the steps of:
extracting, from an input video signal, edge components comprising at least a low-frequency component, a middle frequency component and a high-frequency component;
calculating absolute values of the edge components;
detecting peak values of the absolute values;
holding the peak values for a predetermined period corresponding to an interval between a rise and fall of the edge components;
generating coefficients corresponding to amplitudes of the edge components;
correcting the edge components with the coefficients corresponding to the edge components;
limiting the corrected edge components to a predetermined maximum value; and
combining the corrected edge components;
wherein the correcting step includes multiplying the edge components by the corresponding coefficients;
wherein the combining step includes adding the corrected edge components, and
amplifying low-frequency edge components, middle-frequency edge components and high-frequency edge components separately to generate corresponding values proportional to squares of the low-frequency edge components, middle-frequency edge components and high-frequency edge components such that the larger the amplitude of the original edge component, the larger the coefficient by which the edge component is multiplied.

9. The method as set forth in claim 8, further comprising combining the combined edge components with the input video signal.

10. The method as set forth in claim 8, further comprising:
separating the input video signal by bandpass filters into edge components of different frequencies.

11. The method as set forth in claim 10, further comprising calculating coefficients based on the peak values.

* * * * *